United States Patent

[11] 3,624,689

[72] Inventor Frank F. Rizzo
  1429 Chapman Ave., North Madison, Ohio 44057
[21] Appl. No. 16,856
[22] Filed Mar. 5, 1970
[45] Patented Nov. 30, 1971

[54] FISHING ROD WITH STRIKE-SIGNALLING MEANS
  5 Claims, 4 Drawing Figs.
[52] U.S. Cl. .................................................... 43/17
[51] Int. Cl. ............................................ A01k 97/12
[50] Field of Search ............................................ 43/17

[56] References Cited
UNITED STATES PATENTS
3,063,185 11/1962 Dinger ......................... 43/17
3,238,659 3/1966 Lamb, Jr. ..................... 43/17

FOREIGN PATENTS
1,118,237 6/1968 Great Britain ............... 43/17.5

Primary Examiner—Samuel Koren
Assistant Examiner—Daniel J. Leach
Attorney—Oberlin, Maky, Donnelly & Renner ABSTRACT: A fishing rod characterized in that the line guide at the tip of the rod constitutes a movable switch element which lights a flashlight bulb when there is a pull on the line as caused by a fish being hooked on the lure or striking thereat. The fishing rod herein is further characterized in that it has electric conducting leads therein providing plug-socket connections at its ends with a reel-supporting handgrip having batteries therein and with a switch- and bulb-containing unit, said connections serving to align the line guides on the rod with respect to the reel on the handgrip and with respect to the line guide switch element on said switch- and bulb-containing unit.

PATENTED NOV 30 1971 3,624,689
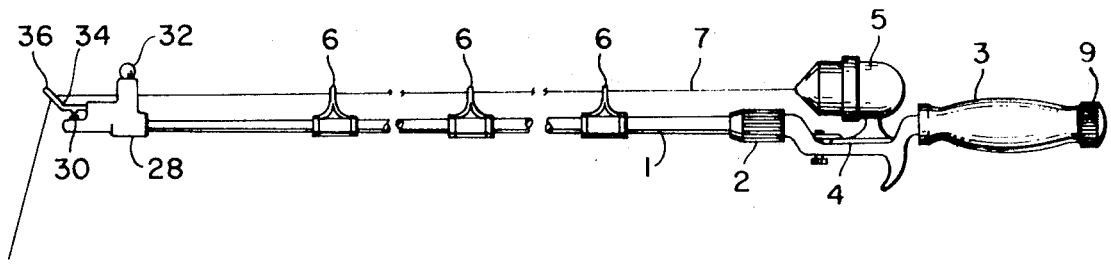
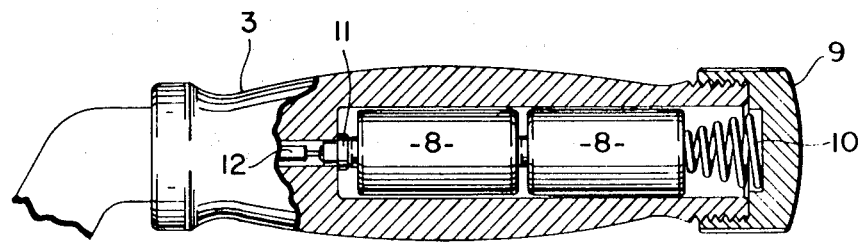
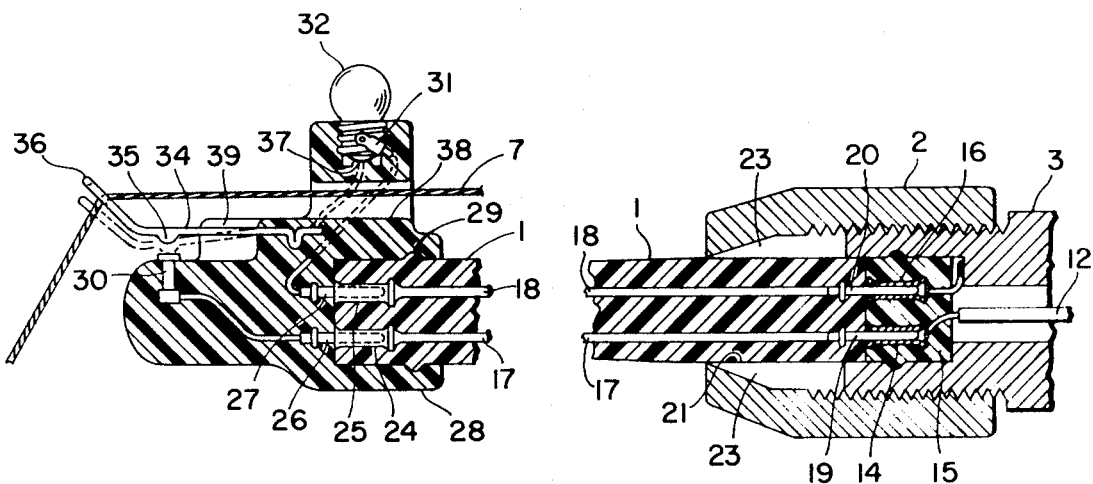
INVENTOR.
FRANK F. RIZZO
BY
Oberlin, Maky, Donnelly & Renner
ATTORNEYS

3,624,689

FISHING ROD WITH STRIKE-SIGNALLING MEANS

BACKGROUND OF THE INVENTION

It is known to provide fishing rods with a strike-signalling light in which the fishing line is attached to a switch to energize a flashlight bulb, the flashlight as a whole or the battery thereof being generally clipped on or otherwise secured on the fishing rod adjacent the butt end thereof. This type of signal means is not of course applicable to fishing rods equipped with spinning reels or bait-casting reels since the fishing line is affixed to the flashlight switch.

It is also known to provide a strike signal light in connection with a casting rod equipped with a reel but the switch-actuating mechanism imposes a frictional drag on the fishing line thus to interfere with the bait-casting operation.

SUMMARY OF THE INVENTION

In the present invention, the flashlight bulb and switch assembly is secured on the tip of the fishing rod to make electrical contact with conductors within the rod, the switch closing contact being in the form of a conventional line guide which does not interfere with the normal casting and reeling operations, except that when a fish strikes the lure or is hooked thereon, the lateral pull on the line guide at the tip will close the electric circuit to cause the flashlight bulb to be energized.

Another characterizing feature of this invention is that the aforesaid light and switch assembly has a plug-in connection in the end of the rod thus to properly orient the line guide thereof with respect to the line guides of the rod. Furthermore, the butt end of the rod is detachably connected to the handgrip and reel-supporting member and has a plug-in connection with the latter for operative connection with batteries contained within the hollow handgrip and for alignment of the rod with respect to the reel-supporting and handgrip member.

Other objects and advantages of the present invention will appear hereinafter.

BRIEF DESCRIPTION OF THE DRAWING

FIG. 1 is a side elevation view of a fishing rod and reel assembly embodying the present invention; and FIGS. 2, 3 and 4 are enlarged central vertical cross section views showing respectively the light and switch unit mounted at the tip of the rod, the connection of the butt end of the rod to the handgrip and reel-supporting assembly, and the batteries within the hollow handgrip.

DETAILED DESCRIPTION OF THE INVENTION

Referring first to FIG. 1, the fishing tackle shown for purposes of illustration, comprises a tapered flexible rod 1 which preferably is of glass fiber either of solid or hollow construction having its butt end secured as by the collet nut 2 to the handgrip 3, the latter being provided with a reel seat 4 for mounting of a suitable reel 5 which may be either of the spinning type or bait-casting type, as well known in the art. The rod 1 is provided with the usual longitudinally spaced-apart line guides 6 through which the fishing line 7 passes, the free end of the line 7 being equipped with a suitable lure (not shown).

As best shown in FIG. 4, the handgrip 3 constitutes a battery case for flashlight batteries 8 which are retained by a screwcap 9 and urged by spring 10 to make contact with the terminal 11 to which an electric conductor 12 is connected, said conductor 12 leading to a sleeve 14 of a socket 15 in the rod-receiving end of the handgrip 3. When the handgrip 3 and cap 9 are made of metal, the other sleeve 16 in the socket 15 may be grounded to the handgrip 3 as shown in FIG. 3.

When the rod 1 is of solid construction as shown, conductors 17 and 18 are molded in place and are provided with contact pins 19 and 20 at the butt end which constitute a plug to make electrical contact within the respective sleeves 14 and 16 in the socket 15. Accordingly, when the butt end of the rod 1 is inserted into the bore 21 in the end of the handgrip 3 the pins 19 and 20 will make electrical contact within the sleeves 14 and 16 and the tightening of the collet nut 2 will contract the collet fingers 23 into tight frictional gripping engagement with the butt end of the rod 1.

The tip of the rod 1 is provided with contact sleeves 24 and 25 on conductors 17 and 18 to constitute a socket to receive the contact pins 26 and 27 of the light and switch unit 28 which is adapted to be forced over the tip of the rod 1 and retained as by a bead 29 on the rod 1 engaged in an undercut in said unit 28.

One contact pin 26 of said unit 28 is connected to the fixed contact 30 and the other contact pin 27 is connected to the terminal 31 for contact by the threaded shell of the flashlight bulb 32. The movable contact 34 of the switch comprises a leaf spring having a contact point 35 thereon and a line guide 36 which preferably is inclined as shown to correspond with the conventional line guide at the tip of a fishing rod. The movable contact 34 is connected to the terminal 37 which contacts the center terminal of the bulb 32. The bulb and switch unit 28 is provided with an opening 38 therethrough through which the fishing line 7 passes.

It can now be seen that the lure (not shown) adapted to be mounted on the end of the fishing line 7 may be cast in normal manner and the fishing line 7 may be reeled in or payed out without any interference by the light and switch unit 28 herein. However, if a fish strikes at the lure or is hooked thereon, the downward pull on the line 7, as viewed in FIGS. 1 and 2, will cause the flexing of the movable contact element 34 to the dot-dash line position to effect contact between the fixed and movable contacts 30 and 35, thus to close an electric circuit through the flashlight bulb 32, whereupon the latter will light up to signal the strike. The unit 28 may be provided with a guide groove 39 to prevent bending of the movable contact 34 in the event that the pull on the line 7 is inclined from a vertical plane passing through the axis of the rod 1.

It is to be noted that the plug-socket connections between the rod 1 and the handgrip 3 and light and switch unit 28 serve to align the line guides 6 with the reel 5 and with the line guide 36. Moreover, because the bulb 32 is disposed above the fishing line 7 it will readily be visible by the fisherman.

I, therefore, particularly point out and distinctly claim as my invention:

1. A fishing rod with strike-signalling means comprising a rod having a handgrip at one end on which a reel is adapted to be supported for passage of a fishing line therefrom through longitudinally spaced-apart line guides on said rod; electrical conductor means in said rod operatively connected to battery means contained within said handgrip and extending to the tip of said rod; a flashlight bulb and switch unit on the tip of said rod having electrical contact with said conductor means so that closing of the switch therein lights said bulb; said switch comprising a fixed contact and a movable spring contact which constitutes a line guide at the tip of said rod and which is laterally flexed to make contact with said fixed contact to close said switch thus to light said bulb when a fish strikes at, or is hooked on, a lure adapted to be secured to the fishing line passing through said line guides; said rod and handgrip having an electrical plug-socket connection with each other.

2. The fishing rod of claim 1 wherein said electrical plug-socket connection between said rod and handgrip aligns the line guides of said rod with a reel adapted to be mounted on said hand grip.

3. A fishing rod with strike-signalling means comprising a rod having a handgrip at one end on which a reel is adapted to be supported for passage of a fishing line therefrom through longitudinally spaced-apart line guides on said rod; electrical conductor means in said rod operatively connected to battery means contained within said handgrip and extending to the tip of said rod; a flashlight bulb and switch unit on the tip of said rod having electrical contact with said conductor means so that closing of the switch therein lights said bulb; said switch comprising a fixed contact and a movable spring contact which constitutes a line guide at the tip of said rod and which is laterally flexed to make contact with said fixed contact to close said switch thus to light said bulb when a fish strikes at, or is hooked on, a lure adapted to be secured to the fishing line passing through said line guide; said unit and rod and said rod and handgrip having alignment means respectively to align the line guide of said unit with the line guides of said rod and to align the line guides of said rod with a reel adapted to be mounted on said handgrip.

4. The fishing rod of claim 3 wherein each of said alignment means comprises an electrical plug-socket connection to electrically interconnect said conductor means respectively with said battery means and said bulb and switch unit.

5. A fishing rod with strike-signalling means comprising a rod having a handgrip at one end on which a reel is adapted to be supported for passage of a fishing line therefrom through longitudinally spaced-apart line guides on said rod; electrical conductor means in said rod operatively connected to battery means contained within said handgrip and extending to the tip of said rod; a flashlight bulb and switch unit on the tip of said rod having electrical contact with said conductor means so that closing of the switch therein lights said bulb; said switch comprising a fixed contact and a movable spring contact which constitutes a line guide at the tip of said rod and which is laterally flexed to make contact with said fixed contact to close said switch thus to light said bulb when a fish strikes at, or is hooked on, a lure adapted to be secured to the fishing line passing through said line guides; said unit having a lateral upward projection providing a socket in which said bulb is mounted and a passage through said lateral projection for passage passage of the fishing line to the line guide of said movable spring contact.

* * * * *